Figure 1:
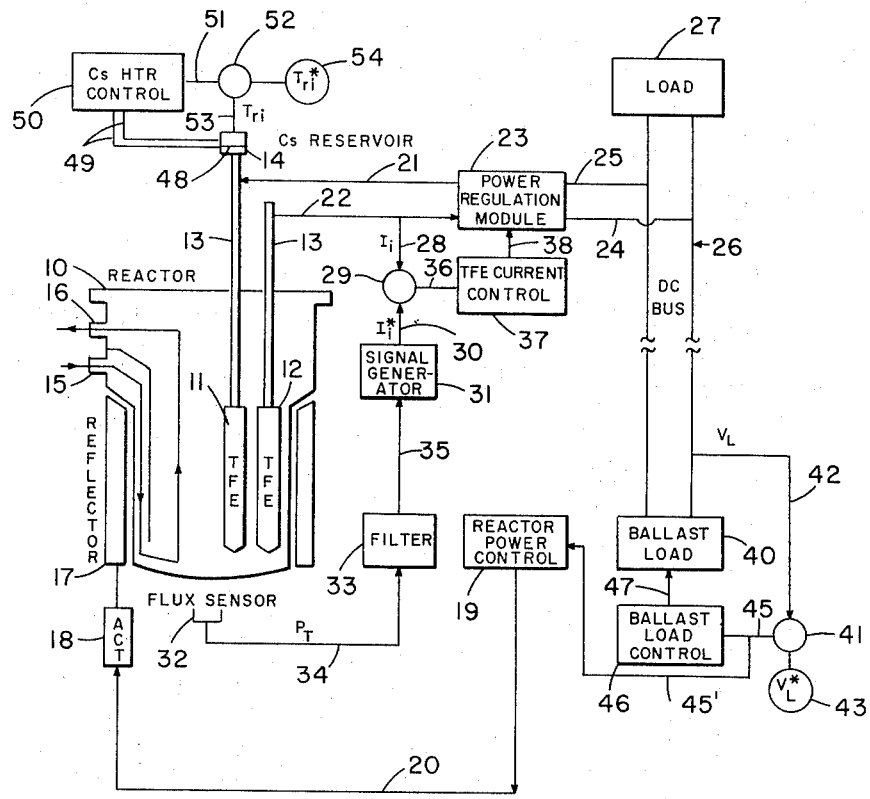

United States Patent [19]
Wilkins et al.

[11] 3,801,445
[45] Apr. 2, 1974

[54] THERMIONIC REACTOR ELECTRICAL CONTROL SYSTEM

[75] Inventors: Daniel R. Wilkins, Saratoga; Paul R. Hill, San Jose, both of Calif.

[73] Assignee: The United States of America as represented by the United States Atomic Energy Commission, Washington, D.C.

[22] Filed: Sept. 28, 1972

[21] Appl. No.: 293,175

[52] U.S. Cl. .................. 176/39, 176/20 R, 310/4 R
[51] Int. Cl. ............................................. G21c 7/00
[58] Field of Search ............. 310/4 R; 176/20 R, 39

[56] References Cited
UNITED STATES PATENTS

| | | |
|---|---|---|
| 3,113,091 | 12/1963 | Rasor et al. .................... 176/39 X |
| 3,234,412 | 2/1966 | Sankovich et al. ............... 176/39 X |
| 3,493,792 | 2/1970 | Antermyer ........................... 310/4 |
| 3,259,766 | 7/1966 | Beckjord et al. .................... 176/39 |
| 3,673,440 | 6/1972 | Paine et al. ........................... 310/4 |
| 3,607,631 | 9/1971 | Hobson ................................ 310/4 |

Primary Examiner—Benjamin R. Padgett
Assistant Examiner—P. K. Pavey
Attorney, Agent, or Firm—John A. Horan; F. A. Robertson; L. E. Carnahan

[57] ABSTRACT

A thermionic reactor electrical hookup and control system which provides for regulation of plant electrical output, individual control of fuel element emitter temperatures, and isolation of fuel element failure events. The control system is applicable to fast and thermal spectrum thermionic reactors for ground, sea and space applications.

6 Claims, 3 Drawing Figures

THERMIONIC REACTOR ELECTRICAL CONTROL SYSTEM

BACKGROUND OF THE INVENTION

The invention described herein was made in the course of, or under, Contract No. AT(04-3)-771, with the United States Atomic Energy Commission.

This invention relates to thermionic reactors, particularly to a control system for thermionic reactors, and more particularly to an electrical control system capable of utilizing two methods for regulating a thermionic reactor either separately or in conjunction with one another.

Thermionic generators useful for remote electrical power sources are known in the prior art as evidenced by U. S. Pat. Nos. 3,272,658 issued Sept. 13, 1966 and 3,296,032 issued Jan. 3, 1967. Control systems for thermionic converters are also known in the prior art as exemplified by U. S. Pat. Nos. 3,493,792 issued Feb. 3, 1970, and 3,532,960 issued Oct. 6, 1970. In addition much prior effort has been directed toward the development of a thermionic reactor for utilization in space applications. While these prior efforts have produced satisfactory results there exists a need for a simple yet effective control system for regulation of plant electrical output and control of the fuel elements thereof.

SUMMARY OF THE INVENTION

The present invention provides an electrical hookup and control system for a thermionic reactor which provides for regulation of plant electrical output, individual control of fuel element emitter temperatures, and isolation of fuel element failure events, thereby fulfilling the above-mentioned need for a simple yet effective control system.

Therefore, it is an object of the invention to provide an electrical control system for a thermionic reactor.

A further object of the invention is to provide an electrical control system capable of utilizing two methods of regulating a thermionic power plant which methods may be utilized individually or in combination.

Another object of the invention is to provide an electrical control system which involves either the utilization of a ballast load on a d-c bus and/or in response to error signals from the d-c bus for regulating a thermionic power plant.

Another object of the invention is to provide a thermionic reactor electrical hookup and control system for regulation of plant electrical output, individual control of fuel element emitter temperatures, and isolation of fuel element failure events.

Another object of the invention is to provide for an electrical control system applicable to fast and thermal spectrum thermionic reactors for ground, sea and space applications.

Other objects of the invention will become readily apparent from the following description and accompanying drawings:

BRIEF DESCRIPTION OF THE INVENTION

Figure 2:
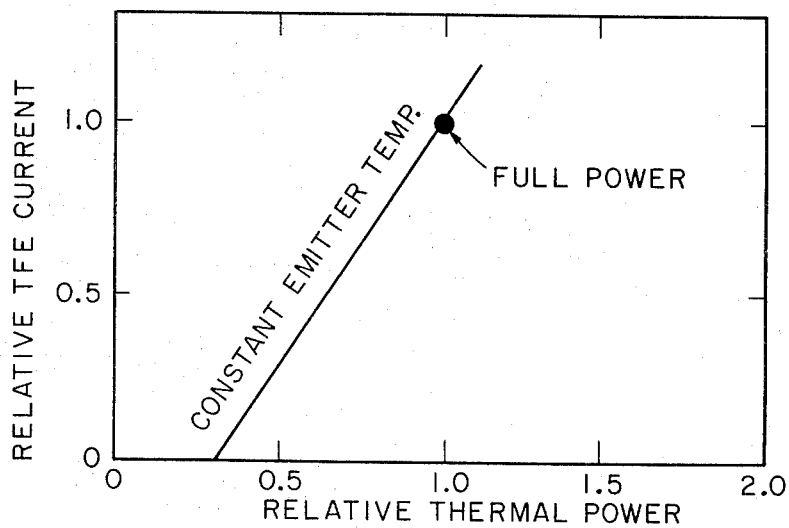
Figure 3:
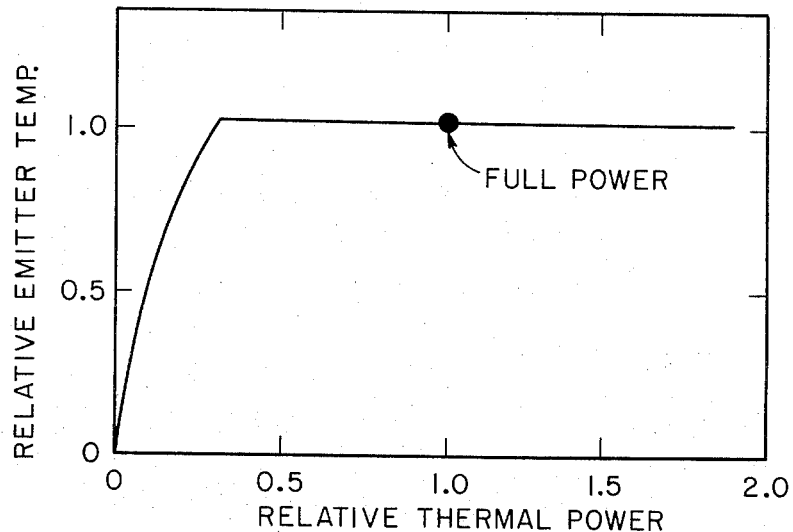

FIG. 1 diagrammatically illustrates the inventive electrical control system;

FIG. 2 is a graphical illustration of the steady state relationship between current and thermal power for the control law utilized in the control system; and FIG. 3 graphically shows the emitter temperatures as a function of thermal power when utilizing the inventive system.

DESCRIPTION OF THE INVENTION

The invention is directed to a thermionic reactor electrical hookup and control system which provides for regulation of plant electrical output, individual control of fuel element emitter temperatures and isolation of fuel element failure events. The inventive control system utilizes two methods for regulating the thermionic power plant which may be utilized singly or in combination, these being the use of a ballast load on a d-c bus, and by response to error signals from the d-c bus.

The inventive electrical control system is diagrammatically illustrated in FIG. 1 wherein a reactor vessel 10 is provided with thermionic fuel elements (TFE) connected electrically in pairs, only two such TFE indicated at 11 and 12, are shown for clarity, one TFE of each pair being connected positive and one negative with respect to ground. By way of example, a reactor core may contain about 80 pairs of twelve cell TFEs and may additionally be provided with an outer row of 48 beryllium oxide internal reflector rods (not shown). Also, for example, the TFEs are 1.01 inches in diameter with an outer sheath material of Ceramvar and are provided with a handle assembly, indicated generally at 13, for handling operations and electrical and mechanical connections, such handle assembly, for example, containing a cesium reservoir 14 (only one shown) and a fission product trap (not shown). Coolant, such as NaK, is circulated through vessel 10 and upwardly between the TFEs, as indicated by the arrows, and is connected by inlet 15 and outlet 16 with appropriate heat exchangers, not shown. An external reflector cup assembly 17 is positioned about the lower portion of vessel 10 and provides the reactivity control of the TFEs, along with the internal reflector rods, reflector cup 17 being raised and lowered by an actuator 18 which may be manually controlled by means not shown, but known in the art as well as by an electrical reactor power control 19 connected electrically therewith via lead 30. Inasmuch as the details of the TFEs 11 and 12, the reactor vessel 10 and the reflector cup 17 and actuator 18 do not constitute part of this invention, further description thereof is deemed unnecessary.

The following description of the electrical control system is directed to a single pair of TFEs but it is understood that each pair of TFEs in the reactor vessel will be controlled in a like manner by the inventive system. Referring now to the control for the pair of TFEs 11 and 12 electrical current leads indicated at 21 and 22, respectively, are fed to a power regulation module 23, the output terminals thereof being connected in parallel by electrical leads 24 and 25 on a d-c bus indicated generally at 26 containing an electrical load 27. The power regulation module 23 serves the following two important functions:

1. To control the electrical current extracted from each TFE pair in accordance with a control law to be described subsequently.
2. To perform a reliability function in the event that a partial or complete open circuit failure is encountered in either TFE of a TFE pair.

The TFE pair current, $I_t$, in lead 22, indicated at 28 and directed to an electronic adder 29, is controlled to a demand signal, $I_i^*$, in an output lead 30 from a signal generator 31. The demand signal $I_i^*$ is linearly related to the measured thermal power level ($P_T$) of the reactor which is sensed by a flux sensor 32 and transmitted through a filter 33 to the signal generator as indicated by leads 34 and 35. An error signal 36 proportional to the difference $I_i\text{-}I_i^*$ is generated in the electronic adder 29, and directed to a TFE current control 37, the output therefrom indicated at 38 is fed into power regulation module 23, which as described hereinafter regulates the electrical current extracted from each TFE pair, the first of the above-mentioned functions.

Regarding the second of the above-mentioned functions, electronic switches (not shown) are located with each power regulation module 23, between each TFE current leads (21-22) and ground. One of these switches can be closed in the event that an open circuit failure is encountered in either TFE 11 or 12 to convert the open circuit to a short circuit and permit the power from the unfailed TFE to continue to be processed.

A third function of the power regulation module 23 is to step up the d-c voltage level to a value which is consistent with the demands of the power user (load 27).

As described above, output terminals 24 and 25 of power conditioning module 23 are connected in parallel on d-c bus 26 which contains an electrical load 27. In addition, the d-c bus contains a ballast load 40 and control circuit therefor which includes an electronic adder 41 connected to receive a voltage load signal ($V_L$) from d-c bus 26 as indicated at 42 and to receive a voltage control or demand signal 43, electronic adder 41 producing an error signal 45 proportional to the difference between the actual d-c bus voltage $V_L$ (42) and the demand signal (43) which is directed to a ballast load control 46, the output of which, as indicated by lead 47, is directed to ballast load 40 for controlling same.

Automatic control of the temperature of the TFE cesium reservoir 14 is obtained by a heater such as electric coils 48 wrapped about reservoir 14 and connected via leads 49 to a heater control 50 activated by an error signal 51 from an electronic adder 52 which is proportional to the difference between the actual temperature ($T_{ri}$) from the reservoir 14 indicated at 53 and desired or demand temperature value $T_{ri}^*$ indicated at 54.

Control of TFE pair of electrical currents is based upon the fact that, for a given emitter temperature, electron cooling in a thermionic cell is proportional to current over a broad current range; and is only weakly influenced by variations of electrode work functions, cesium reservoir temperature and interelectrode spacing. The herein selected control law, calls for controlling the TFE pair electrical current at or near open circuit until a threshold reactor thermal power level is reached. This threshold is selected such that TFE emitters will have achieved operating temperature but will be rejecting heat to the collectors through radiation, cesium conduction and structural losses only. Once this threshold reactor thermal power level is reached, additional increases in reactor thermal power will be accompanied by proportionate increases in TFE pair electrical current to balance electron cooling heat transfer against the increased power generation. In this manner, emitter temperatures of thermionic fuel elements are held approximately constant over a range of electrical loads from effectively zero to 100 percent.

The steady state relationship between current and thermal power for this control law is depicted in FIG. 2; while emitter temperature as a function of thermal power is shown in FIG. 3. TFEs in different radial zones of the reactor may be operated at the same emitter temperature by varying the thermal power threshold above which electrical current is drawn and the proportionality constant relating current to reactor power level.

Automatic set point control of TFE cesium reservoir temperatures is utilized in the herein described thermionic reactor. TFE cesium reservoir temperatures will normally be established prior to or during the plant startup sequence and not be changed during normal plant operation. This straightforward cesium reservoir temperature control arrangement is facilitated by operating the TFEs at fixed emitter temperatures.

Two methods for regulating the d-c bus voltage are carried out in the inventive control system for the thermionic power plant:

The first method involves the use of ballast load 40 on d-c bus 26 wherein the ballast load is varied via ballast load control 46 to maintain the d-c bus voltage constant. This control provides a precise regulation of bus voltage over a range of power levels dictated by the capacity of the ballast load.

The second method consists of controlling reactor thermal power level in response to an error signal from the d-c bus 26. In this control procedure, if the bus voltage falls below tolerance as indicated by the voltage load ($V_L$) error signal indicated at 45' and directed to reactor power control 19, reactivity is inserted to raise the thermal power level of the reactor, this being accomplished by a command signal transmitted via lead 20 to actuator 18 which control the reflector 17. This increases the electrical current extracted from each TFE pair and, in turn, the bus voltage. The process continues until the error signal 45', derived from the d-c bus voltage via adder 41, is reduced to zero.

The second method for regulating d-c bus voltage in a thermionic power plant reduces or eliminates the need for ballast load 40, but this method of bus voltage regulation is much slower than can be accomplished with a ballast load, and requires more frequent movement of the control drums. Therefore, a combination of the two control procedures may effectively be utilized with variations in ballast load being employed for fast regulation of the bus voltage in response to small and/or frequent changes in the user electrical load, and gross changes in electrical load being accommodated on a slower basis by changing the power level of the reactor.

The above described control of the TFE electrical currents and cesium reservoir temperatures provides a number of operational and reliability features outlined as follows:

1. Electrical control is modular. This feature enhances reliability, and facilitates buildup of the reactor from a non-TFE core to a TFE core in experimental reactors. As each TFE pair is added to the reactor vessel 10, a power regulation module 23 and associated control elements is incorporated and the output is put on the d-c bus 26. Nuclear and hydraulic control of the plant are unchanged.

2. From the plant operator's viewpoint, operation of the thermionic plant is similar to any plant. Specifically, the reactor operator is primarily concerned with thermal power, hydraulic variables and plant electrical load and is not routinely concerned with TFE electrical currents, or cesium reservoir temperatures.

3. Reduced thermal cycling of emitters is expected to prolong plant lifetime. Following a scram, the electrical currents from the TFE pairs are initially reduced at the rate required to remove stored energy from the fuel and emitter temperatures remain unchanged. Once the electrical currents reach zero (or the selected minimum), the emitters radiation cool to the collectors. This leads to a far less severe thermal shock than will occur if full current continues to be demanded from the TFE pair even after the reactor thermal power has been reduced to zero.

4. The electrical control system is permissive of cell and TFE degradations and failures. Variations in cesiated electrode work functions, interelectrode spacing and cesium pressure will have minimal influence on cell and TFE operating conditions. Inter-electrode short circuit, loss of cesium open circuit and collector short to ground failure events, lead to a loss of output from only those cells directly associated with the failure event. All other cells in the reactor continue to operate on a business-as-usual basis. In the event that cell degradations and failures reduce the d-c bus voltage below tolerance, the power level of the reactor is raised to make up the voltage deficiency. Hence, the effects of failure are shared by all the remaining cells in the reactor not by a few cells in the vicinity of those which have failed.

5. A fast reactivity feedback from core structure and coolant is accomplished in the inventive electrical control system.

6. The inventive control system does not have a thermionic burnout behavior. In particular, the emitter temperature rises to the full operating temperature at approximately one-third design rated power, and is constant for thermal powers above this level, is illustrated in FIG. 3.

It has thus been shown that the inventive electrical hookup and control system provides regulation of thermionic power plant electrical output, individual control of fuel element emitter temperatures, and isolation of fuel element failure events, the control system being applicable to fast and thermal spectrum thermionic reactors for ground, sea and space applications.

While a particular embodiment of the inventive electrical control system has been illustrated and described, modifications and changes will become apparent to those skilled in this art, and it is intended to cover in the appended claims, all such modifications as fall within the spirit and scope of the invention.

We claim:

1. In a thermionic reactor having a vessel containing at least one pair of thermionic fuel elements and means for controlling the reactivity of the reactor, a control system comprising: means for controlling temperature of a cesium reservoir for each associated thermionic fuel element, a d-c bus means, power regulation means electrically connected to said d-c bus means and operatively connected to a pair of associated thermionic fuel elements, a ballast load means connected to said d-c bus means, control means for said ballast load means, and reactor power control means electrically connected to said d-c bus means and responsive to an error signal therefrom for activating an associated reactor reactivity control means.

2. The control system defined in claim 1, wherein said cesium reservoir temperature control means comprises heater means for said cesium reservoir, heater control means operatively connected to said heater means, and means responsive to the temperature of said reservoir and to an established control temperature for activating said heater control means.

3. The control system defined in claim 1, wherein said power regulation means comprises a power regulation module constructed to receive current inputs for an associated pair of thermionic fuel elements and having outputs connected to said d-c bus means, current control means operatively connected to said module means, and means responsive to current inputs to said module means and to an established control signal for activating said current control means.

4. The control system defined in claim 3, wherein said means for activating said current control means comprises an electronic adder means constructed to receive current inputs from an associated pair of thermionic fuel elements and to receive a control signal from a signal generator means, said signal generator means being constructed to receive input signals representing thermal power of an associated thermionic reactor.

5. The control system defined in claim 1, wherein said control means for said ballast load means comprises a ballast load control operatively connected to said ballast load, and an electronic adder means responsive to signals representing voltage load on said d-c bus means and voltage load control signals for activating said ballast load control.

6. The control system defined in claim 1, additionally including an external load connected to said d-c bus means.

* * * * *